United States Patent [19]

Faude

[11] 4,326,124
[45] Apr. 20, 1982

[54] LOCKING APPARATUS FOR PREVENTING UNAUTHORIZED ACCESS OR ACTIONS

[75] Inventor: Rude Faude, Balingen, Fed. Rep. of Germany

[73] Assignee: BSG Schalttechnik GmbH & Co. KG., Balingen, Fed. Rep. of Germany

[21] Appl. No.: 134,825

[22] Filed: Mar. 28, 1980

Related U.S. Application Data

[63] Continuation-in-part of Ser. No. 963,054, Nov. 21, 1978.

[30] Foreign Application Priority Data

Mar. 28, 1979 [DE] Fed. Rep. of Germany ....... 2912258

[51] Int. Cl.³ .............................................. G06K 7/08
[52] U.S. Cl. ................................... 235/382; 235/449; 340/825.31
[58] Field of Search ............... 235/382, 449, 493, 499; 365/133; 340/149 A

[56] References Cited

U.S. PATENT DOCUMENTS

| | | | |
|---|---|---|---|
| 3,626,160 | 12/1971 | Hagopian | 235/449 |
| 3,774,179 | 11/1973 | Wiegand | 365/133 |
| 3,820,090 | 6/1974 | Wiegand | 365/133 |
| 3,953,712 | 4/1976 | Horvath | 235/449 |

*Primary Examiner*—Harold I. Pitts
*Attorney, Agent, or Firm*—Edwin E. Greigg

[57] ABSTRACT

Apparatus for actuating a security system which includes an actuator element, such as a key, in which is embedded a plurality of "Wiegand effect" magnetic rods forming at least one track of magnetically coded information. When the actuator element is inserted into a complementary element, a conditioning permanent magnet of a given polarity at the entrance of the complementary element switches each magnetic rod into a first magnetic state, then a drive permanent magnet of an opposite polarity disposed inwardly of the conditioning magnet switches each magnetic rod into a second magnetic state as the magnetic rod moves past it, causing a sharp voltage pulse to be generated within a sensor coil disposed close to the drive magnet and the magnetic rod being switched. The information carried by the actuator element is transmitted as a series of voltage pulses generated by one or more sensor coils to known signal processing circuits, which actuates the security system to permit an authorized action if this information is the same as information stored in a memory of the signal processing circuits.

4 Claims, 6 Drawing Figures

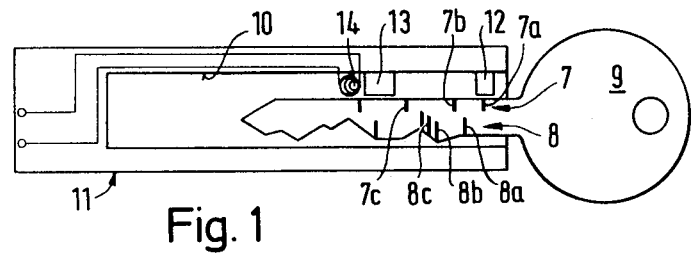
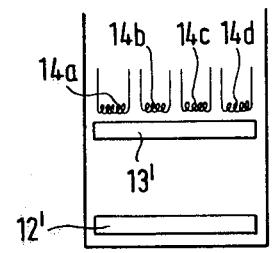
Fig. 1
Fig. 1a
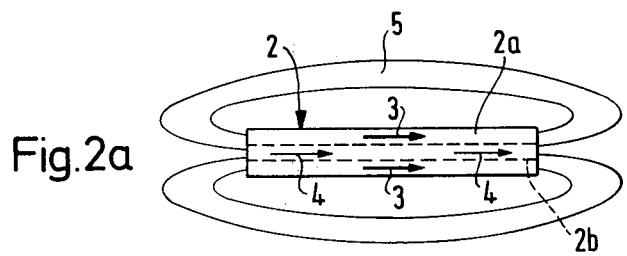
Fig. 2a
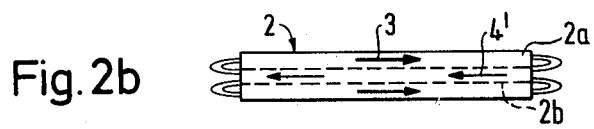
Fig. 2b
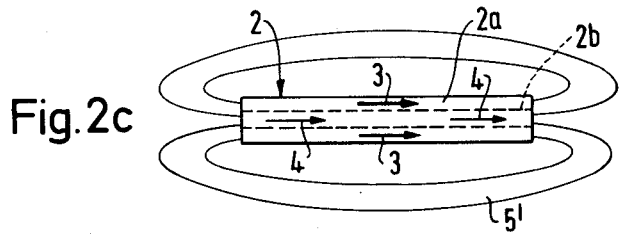
Fig. 2c
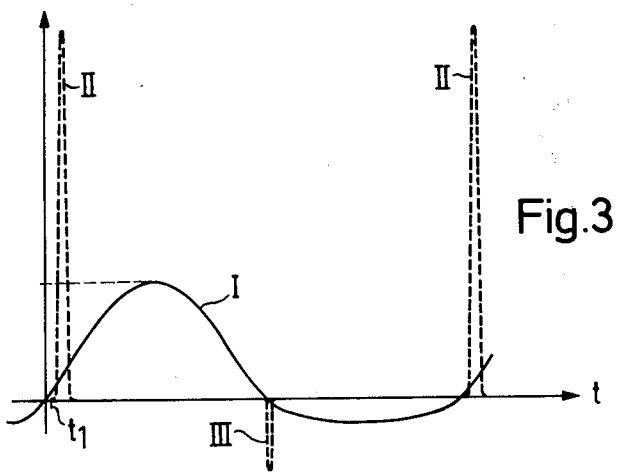
Fig. 3

LOCKING APPARATUS FOR PREVENTING UNAUTHORIZED ACCESS OR ACTIONS

CROSS REFERENCE TO RELATED APPLICATIONS

U.S. Patent Application Ser. No. 963,054, inventors Carl Granholm and Rudy Faude, filed on Nov. 21, 1978, of which the present application is a continuation in part.

FIELD OF THE INVENTION

The invention relates to an apparatus to be used in association with devices for preventing unauthorized access to buildings, roads, automobiles, etc. and/or the enabling or disenabling of alarm systems which signal the unauthorized entry of persons to a secured area or an unauthorized action. More particularly, the invention relates to a key carrying an information code in the form of magnetic fields, and a key receiver having magnetic sensors which generate a code signal when the key is inserted into the key receiver, which may be compared with a stored code to actuate a security device.

BACKGROUND OF THE INVENTION

It is known to the art to provide highly complicated lock devices for rooms, buildings, and objects such as automobiles, which are secured by means of locked doors, to prevent unauthorized access or unauthorized actions, such as the unauthorized removal of an automobile. The conventional cylinder tumbler locks which are commonly used as these lock devices and which can be adjusted up to as high as 5000 lock combinations, would appear to be an effective device for these purposes. However, experience teaches otherwise, even when alarm systems are provided separately from the lock and key arrangements for the sake of further protecting enclosed areas or objects such as automobiles. Even in very complicated lock systems using conventional cylinder tumbler locks, it is not necessary to have an original key in order to make a duplicate key, and thus defeat the purpose of the lock system.

A primary reason for the possibility of duplicating the key, for even a very complicated cylinder tumbler lock, exists in the fact that each cylinder tumbler lock already has the information code for the mechanical closures which solely enables the lock to be opened, readily available in mechanical form. Thus, for example, a deformable element can be inserted into the cylinder tumbler lock to determine the pin configuration therein. Then an appropriate duplicate key can be created on the basis of this information, either immediately or at a a later time, so that an object such as an automobile can be taken into possession by one apparently authorized to do so, or closed buildings or rooms can be entered without difficulty.

In the above referenced U.S. patent application Ser. No. 963,054, to which this application represents a supplement, an apparatus for actuating a locking device, security system and the like is described for preventing unauthorized access to protected areas, and/or unauthorized removal of protective objects and/or simultaneous arming and disarming of alarm systems. The apparatus includes an actuator element such as a key, and a complementary element such as a lock responding thereto, which enables authorized actions. The actuator element contains at least one track of coded information which is carried in a non-mechanical manner. A sensor, which is disposed in the complementary element, scans the code track in a non-mechanical manner to retrieve the coded information and delivers it to a comparator circuit which compares the information retrieved from the actuator element with information stored in a memory (PROM) and generates an enabling signal to operate the locking device, security device, and the like. Thus, in this device, the sole accurate lock combination permitting opening is no longer present in a mechanical or physical form, and also is not normally stored in a memory in the immediate vicinity of the lock, so that unauthorized actions are practically impossible unless force is used. Furthermore, the number of possible lock combinations which may be used in this device is higher by several orders of magnitude than the number of possible lock combinations which can be used in cylinder tumbler locks, so that ascertaining the correct combination empirically is practically impossible.

A repetition of the contents of the above referenced U.S. patent application Ser. No. 963,054, to which this invention expressly represents a supplement, is not included herein for the sake of limiting the length of this application. It will be understood, however, that the entire content of the U.S. patent application Ser. No. 963,054 should be considered as already known in this application, and is incorporated herein by reference.

In the apparatus disclosed in the above referenced U.S. patent application Ser. No. 963,054, the data track of the actuator element is preferably a series of transparent and opaque fields which are moved between a source of infra-red radiation, such as suitable light emitting diodes, and infra-red radiation sensors disposed within the complementary element during insertion of the actuator element. The infra-red sensors detect the distribution of the transparent and opaque fields and generate a corresponding pulsed electrical signal. In these opto-electric devices and evaluation circuits, the use of light beams, even in the invisible infra-red range, could prove to be very difficult for the purpose of evaluation, because the effects of soiling low signal amplitudes and correspondingly complicated and sophisticated discrimination, as well as a certain dependency on the relative motion between the actuator element and the infra-red sensor, require suitable compensatory measures and sophisticated evaluation logic means.

Thus, there is a need, in security systems such as described in the above referenced U.S. patent application Ser. No. 963,054, for less expensive, or dependable information track-scanning and evaluation devices, which do not depend on the relative speed between the actuator element and the sensor.

SUMMARY OF THE INVENTION

In an apparatus for actuating a security system which includes an actuator element carrying coded information, and a complementary element which receives the actuator element and which includes a sensor for scanning the coded information on the actuator element in a non-mechanical manner, the coded information is in the form of a given distribution of magnetic field lines on the actuator element, which is produced by a plurality of magnetic elements affixed to the actuator element. The sensor element includes at least one electrical coil, in which a sequence of electrical voltage pulses are induced by the distribution of magnetic field lines on the actuator element during movement of the actuator element in a given direction within the complementary element relative to the sensor element. These magnetic scanning devices have the advantage over the opto-electric scanning devices described in the above referenced U.S. patent application Ser. No. 963,054, in that soiling of the actuator element or of the complementary element does not detrimentally affect these magnetic scanning devices. Furthermore, in the present invention, no external electric supply sources are needed in the area of scanning, that is in the area where the signal information is generated, because the encoded information forms as an electrical signal derived from the movement between the actuator element and the sensor element.

In a preferred embodiment of the invention, the magnetic elements of the actuator element are special "Wiegand" magnetic elements which can be switched between two magnetic states under the influence of two external magnetic fields having opposite polarity. The complementary element includes one magnet disposed as its entrance to switch the magnetic elements into a first magnetic state when the actuator element is inserted therein, and a second permanent magnet disposed adjacent the sensing coil which switches these magnetic elements into their second magnetic state, which produces a high voltage pulse of substantially constant amplitude in the adjacent sensing coil. Thus the encoded information is entirely independent of the actual speed of movement of the actuator element relative to the sensing coil. Also, the extraordinary size of the constant signal amplitude of the encoded information, which can be established at practically any speed, makes pulse forming or discriminating means superfluous in the associated evaluation circuit. Also, reverse motions, that is, motions counter to the actual insertion direction of the actuator element into the complementary element, are not involved in generating signal information, so that logic discriminator circuits are not required to sort out undesired signal information produced by reverse motion of the actuator element.

The invention will be better understood and further objects and advantages thereof will become more apparent from the ensuing detailed description of a preferred embodiment, taken in conjunction with the drawings.

THE DESCRIPTION OF THE DRAWINGS

FIG. 1 shows the side view a reception opening in the sensor area of a complementary element together with an actuator key inserted therein, the inserted key being shown in plan view for the sake of clarity;

FIG. 1a shows a possible distribution of scanner coils and drive magnets in the sensor area of the complementary element, for use with an actuator element having a plurality of coding tracks;

FIGS. 2a through 2c illustrate the magnetic states of one of the magnetic carriers of signal information affixed to the actuator element; and FIG. 3 shows in graph form the course of the external drive magnet field which affects switching of the magnetic carriers of signal information, and the electrical pulses in the sensor coils generated by the switching of the magnetic carriers.

The disposition of the permanent magnets and the magnetic elements as selected is shown in the figures for reasons of further understanding of the invention. It will be understood that the magnets and magnetic elements will be disposed in such a manner that the effects obtainable by means of the action of the magnetic fields are in fact attained.

DESCRIPTION OF THE PREFERRED EMBODIMENT

The basic concept of the invention is to generate a non-mechanical interaction between the sensor which scans the signal information encoded on the actuator element wherein the areas on the actuator element generate this signal information by means of an alternating magnetic effect, as a modification and further development of the opto-electric effect described in U.S. patent application Ser. No. 963,054. Because of this alternating magnetic effect, which is described in detail below, some of the circuit elements and logic circuits described in U.S. patent application No. 963,054, become, to a certain extent, superfluous. However, it should be noted that the signal evaluation electronic circuits in their essential features can be used for the present invention as well as in the manner in which they are described in U.S. patent application Ser. No. 963,054, so that in this sense the present invention also represents an improvement and a supplement to U.S. application Ser. No. 963,054.

In a simple embodiment of the invention, the actuator element can be a key having inlays of permanent magnets or other discrete particles of materials which generate a continuous magnetic field, and, as they pass by one or more sensor coils, induce corresponding voltage pulses in the sensor coils.

However, in a preferred embodiment of the invention, the principle advantage of the present invention relates to the utilization of the so-called "Wiegand effect", known per se, which will accordingly be described briefly below. This Wiegand effect is based on the recognition that specially treated and hardened magnetic wires made of a homogenous alloy have a hard shell and a soft core in the magnetic sense, that is, a particular external portion of the wire is hard or magnetizable with difficulty, while an inner portion of the wire is soft or magnetizable with ease. As a result, in order to change the direction of magnetization of the shell portion, a substantially larger external magnetic field must be applied than is necessary to change the direction of magnetization of the inner core portion.

This is schematically illustrated in FIGS. 2a through 2c. In FIG. 2a, the "Wiegand" magnetic element 2 is magnetically saturated, that is, both the shell portion 2a and the core portion 2b of the magnetic element 2 are magnetized in the same direction. This is also indicated by the thick arrows 3 for the shell portion 2a and the thin arrows 4 for the core portion 2b, which point in the same direction. As a result of the shell and core areas 2a, 2b being magnetized in the same direction, the magnetic element 2 produces a comparatively large external magnetic field 5, which noticeably exceeds the geometric dimensions of the magnetic element.

Now if a comparatively small magnetic field in the opposite direction is applied to the saturated magnetic element 2 shown in FIG. 2a, the easily magnetizable core portion 2b of the magnetic element 2 is magnetized in the opposite direction relative to the magnetic direction of the shell portion 2a, as illustrated in FIG. 2b by the arrows 4' for the core portion 2b, which now point in the opposite direction. The result of this is that the magnetic expression of the magnetic element 2 of FIG. 2b toward the outside is practically zero; there is no perceptible magnetic field which extends beyond the dimensions of the magnetic element 2, with the exception of the opposite ends of the magnetic element 2. The magnetic element 2 can now be switched back from the magnetic field distribution state of FIG. 2b into the original state of FIG. 2a as shown in FIG. 2c, by applying an external magnetic field acting in the original direction of magnetization as shown in FIG. 2a. Thus, in FIG. 2c, the arrows 4 indicating the orientation of the core portion magnetic field again point in the original direction as shown in FIG. 2a. The transition from FIG. 2b to FIG. 2c is represented by an extremely fast switchover of the magnetic field and a correspondingly rapid reestablishment of the external magnetic field 5'. This rapid switchover process affects the induction of a very strong magnetic field which can be utilized for the purpose of generating signals. In other words, if a magnetic field acting in the original direction shown in FIG. 2a is introduced into the region of the magnetic element 2 when it is in the state shown in FIG. 2b and if an electric sensor coil is brought into play in a special type of relationship with this process, then the switchover of the magnetic field of FIG. 2b into that of FIG. 2c generates an electrical pulse in the coil which may be of unexpected strength, amounting to 0.5 to 12 volts, for example, depending on the type of coil involved.

This high voltage pulse which is produced at the sensing coil by the switchover of the magnetic field 5 of the magnetic element 2 can be generated in any arbitrary combination of polarity and direction. For the purposes of this discussion, it is assumed that the external magnetic field, which acts in the same direction as the magnetic field 3 of the shell portion 2a and which causes the switchover of the magnetic element 2 from the magnetic state illustrated in FIG. 2b to that of FIG. 2c, is a magnetic field of positive polarity.

With respect to the system as a whole and any possible noises in the system, the pulse which is generated only once with clear and unique definition upon the switchover of the magnetic field 5 has an extremely high signal-to-noise ratio. It is particularly important that no external electrical power supply potential is required for generating this pulse, because merely bringing the magnetic element 2, when it is in the state shown in FIG. 2b into the region of a positive magnetic field affects a single, and only one single switchover of the magnetic field and accordingly induces the pulse in the sensing coil.

While the magnetic element 2 is shown in FIGS. 2a, 2b, and 2c, as an elongated wire or rod-shaped element, it will be understood that other geometrical forms of "Wiegand" magnetic elements are also possible.

In FIG. 3, the course of an active magnetic field whose amplitude I varies with time t is shown, together with the various positive and negative pulses, II, III, generated in the sensor coil. When the magnetic field I reaches a predetermined strength at time $t_1$ as it is increasing in the positive direction, the magnetic state of the magnetic element 2 is switched from the state shown in FIG. 2b into the state shown in FIG. 2c, which in turn produces the sharp voltage spike pulse II across the sensing coil. Typically, the positive magnetic field strength applied to the magnetic element II to affect this switchover will be in the range between 100 and 150 Örsted. A negative external field strength sufficient to switch the magnetic field strength of the magnetic element 2 back into the state of FIG. 2b typically is approximately 20 Örsted.

It is of particular significance that any arbitrary encoding of magnetic fields switchable between two states can be obtained for each code track of the actuator element by embedding "Wiegand" magnetic elements in the actuator element. Thus, as shown in FIG. 1, the actuator key 9 includes embedded magnetic wire lengths or rods 7a, 7b, 7c ... 7y which exhibit the "Wiegand effect" and form a first code track 7. The actuator key 9 also includes a second code track 8 which is formed by the embedded magnetic rods 8a, 8b, 8c ... 8i which also exhibit the "Wiegand effect". The type of encoding may be similar to that described in the above referenced U.S. patent application, Ser. No. 963,054. The complementary element 11 shown in FIG. 1 includes a key receptacle or opening 10 into which the actuator key 9 can be inserted. The complementary element also includes at least one scanner or sensor coil 14, a first permanent drive magnet 12 of one polarity which is disposed within the receptacle 10 adjacent the opening thereof, and a second permanent drive magnet 13, which is disposed within the receptacle 10 adjacent the sensor coil or coils 14.

If the actuator key 9 having the code track 7, 8, is now inserted into the key receptacle 10 of the complementary element 11, then the original magnetic orientation of the individual magnetic rod segments 7a, 7b ... 8a, 8b ... is of no significance, since the first drive magnet 12 switches all of the magnetic rods 7a, 7b ... 8a, 8b ... to a predetermined state of the external magnetic field produced thereby, preferably, to the state shown in FIG. 2b. If some of the magnetic rods, 7a, 7b ... 8a, 8b ... enter the key receptacle opening 10 in the state of FIG. 2b, then they remain in this state; otherwise, they are switched over into this state. The code tracks 7,8 of the actuator key 9 are associated with respective sensor coils 14 disposed in the region of the second drive magnet 13. However, only a single sensor coil 14, associated with the data track 7, is shown in FIG. 1. As insertion of the actuator key 9 into the receptacle 10 continues, the second drive magnet 13 generates a magnetic field such that each embedded magnetic rod 7a, 7b ... 8a, 8b ... switches over into the magnetic state shown in FIG. 2c from the state shown in FIG. 2b, in accordance with the "Wiegand effect", and this sudden increase in the magnetic field induces the voltage pulse spike II of unique definition and extremely high signal-to-noise ratio in the sensing coil 14.

It can be seen that the induction of the pulse spike II is entirely independent of the speed of insertion, since the switchover of the magnetic rods 7a, 7b, ... 8a, 8b ... from the magnetic state of FIG. 2b into the magnetic state of FIG. 2c occurs upon the appearance of a particular active external magnetic field, rather than in accordance with any sort of speed. Therefore, if one of the magnetic rods 7a, 7b ... 8a, 8b ... for example, the magnetic rod 7c, approaches the drive magnet 13, then nothing happens so long as the active external magnetic force has not yet attained the response strength of the magnetic field required to switch the magnetic state of the "Wiegand" magnetic rod 7c. At some time, however, this magnetic field strength is attained as the magnetic rod 7c passes by the drive magnet 13, and at this time, any relative speed from virtually 0 to an extremely high speed is possible. At this moment, the external magnetic field 5' emitted by the magnetic rod 7c changes suddenly, and the speed of this change is obviously not dependent on the speed of insertion of the actuator key 9. Therefore, the amplitude of electrical pulse II generated in the sensor coil 14 is also independent of the speed of insertion of the actuator key 9. Rather, the amplitude of this electrical pulse II is solely a function of the dimensions of the particular magnetic rod 7c in the actuator key 9 and the number of turns in the sensor coil 14 which, in principle, can be made as high as desired by using an appropriately sized conductor to form the sensor coil 14.

It can be seen that a partial reverse movement of the actuator key 9 having the embedded magnetic rods 7a, 7b . . . 8a, 8b . . . is again of no significance, since the passing of the drive magnet 13 now causes no individual change in the magnetic field of the magnetic rods, even if they are withdrawn up to the point of the first conditioning magnet 12. The generation of electrical pulse spikes II, which are to this extent to be associated with the individual encodings and which are induced in the sensor coil 14 is accordingly entirely independent of the particular speed or trembling, withdrawal motions, or the like, so that the reading or scanning of the data tracks 7,8 is accomplished clearly and unequivocally.

The evaluation of the electrical pulses II thus generated in the sensor coil 14 can then be accomplished with any arbitrary arrangement, preferably with the logic circuits described in the above referenced U.S. patent application Ser. No. 963,054. It is also of substantial significance that the actual evaluation circuits may be disposed not in the area of the lock nor even in the area of the complementary element 11, but rather in practically any remote location. For example, when this apparatus is used to protect entrances to a building, these evaluation circuits could be located in the basement of the building. Thus, these remotely located actual evaluation circuits are not accessible in any unauthorized manner, because the generated pulses have such high amplitudes that they can be reliably discriminated and evaluated at any time, even over long connection lines.

It is obvious to one skilled in the art that many modifications can be made to this invention, utilizing the "Wiegand effect". For example, the magnetic field strengths generated by the conditioning magnets 12 can be the same, but of opposite polarity, as that of the drive magnets, 13, without affecting the generation of the voltage pulses, II in the sensing coils 14. Also, an evaluatable pulse III shown in FIG. 3 as extending in a negative direction, can also be generated in a sensor coil upon the switchover of a "Wiegand" magnetic element 2 from the state shown in FIG. 2a to the state shown in FIG. 2b.

Because the number of possible encodings substantially increases by means of each additional code track on the actuator key 9, any arbitrary number of code tracks which may be desired can be disposed on the actuator key 9. For example, the complementary elements shown in FIG. 1a includes four sensor coils 14a, 14b, 14c, 14d which are associated with four separate code tracks on an actuator key inserted into this complementary element. A single conditioning magnet 12' and a drive magnet 13' are effective for all of the sensor coils 14a, 14b, 14c, 14d, which are disposed in close proximity to the drive magnets 13'.

The pulses induced in the sensor coils 14, 14a, 14b . . . are practically independent of temperature and of a constantly high quality. Since the magnetic field of a "Wiegand" magnetic rod 7a, 7b . . . 8a, 8b . . . can change with respect to polarity only once under the effect of a drive magnet 13, multiple evaluations of an event appearing as a result of the encounter of the information carrier and the sensor are impossible.

If desired, the actuator key 9 may be formed in a given mechanical configuration, for example, it may have a specialized arrangement of serrations in order to mechanically open doors, locks, and the like; however, it is the electrical scanning of the code track area which first enables this opening procedure and/or releases additional locks which may be present, and/or disarms alarm systems which may be additionally present, or, if the actuator element is not in order, arms the alarm system and triggers them.

In order not to destroy the formation of magnetic fields by the magnetic rods which are embedded in the key material, it is recommended that the material from which the actuator key 9 is made not be magnetic, or if needed, that it be made of a suitable plastic.

The foregoing relates to a preferred exemplary embodiment of the invention, it being understood that other embodiments and variations thereof are possible within the spirit and scope of the invention, the latter being defined by the appended claims.

What is claimed is:

1. An apparatus for actuating a security system such as a lock including an actuator element such as a key carrying at least one track of coded information related to the authorized actuation of the security system, receiver means for receiving the actuator element, and sensor means carried by the receiver means for scanning the coded information on the actuator element in a non-mechanical manner, wherein:

said at least one track of coded information comprises means for producing a given distribution of magnetic field lines on the actuator element;

the sensor means includes at least one electrical sensor coil, in which a sequence of electrical voltage pulses are induced by the distribution of magnetic field lines during movement of the actuator element in a given direction within the receiver means relative to the sensor means;

the improvement wherein said actuator element comprises a plurality of magnetic rods for generating the distribution of magnetic field lines forming the at least one code track, each magnetic rod having an outer shell portion which is magnetically hard, i.e., difficult to magnetize, and an inner core portion which is magnetically soft, i.e., easy to magnetize, whereby each magnetic rod can be switched from a first magnetic field state into a second magnetic field state under the influence of an external magnetic field of given minimum strength and polarity, and each magnetic rod can be switched from the second magnetic field state into the first magnetic field state under the influence of another external magnetic field of given minimum strength and opposite polarity, and wherein said receiver means comprises:

a complementary element which defines a recess or receptacle having an open end for receiving said actuator element;

first conditioning magnet means, carried by said complementary element and disposed adjacent the open end of the receptacle, for switching the plurality of magnetic rods into the first magnetic state; and second drive magnetic means, disposed along the receptacle inwardly of the conditioning magnet means, for switching the plurality of magnetic rods into the second magnetic state;

further wherein for each track, a specific sensor coil is disposed adjacent one of the conditioning and drive magnet means, whereby a voltage pulse spike can be induced in the sensor coil as a result of the switching of the magnetic state of each magnet rod by said one of the conditioning and drive magnet means.

2. An apparatus, as described in claim 1, wherein the actuator element comprises a longitudinal portion having mechanical serrations for the purpose of supplementary mechanical unlocking of a lock of the security system.

3. An apparatus, as described in claim 2, wherein the plurality of magnetic rods are embedded within the actuator element, and are arranged transversely to the direction of movement and are covered by at least one covering layer such that their distribution is not recognizable.

4. An apparatus, as described in claim 1, wherein the actuator element is formed of non-magnetic material.

* * * * *

UNITED STATES PATENT AND TRADEMARK OFFICE
CERTIFICATE OF CORRECTION

PATENT NO. : 4,326,124
DATED : April 20, 1982
INVENTOR(S) : Rudolf Faude

It is certified that error appears in the above—identified patent and that said Letters Patent is hereby corrected as shown below:

On The Title Page Item,

[75], "Rude" should be -Rudolf-

*Signed and Sealed this*

*Seventeenth* Day of *August 1982*

[SEAL]

Attest:

GERALD J. MOSSINGHOFF

*Attesting Officer*　　*Commissioner of Patents and Trademarks*